United States Patent [19]

Macris

[11] Patent Number: 5,239,900
[45] Date of Patent: Aug. 31, 1993

[54] POWER SCREWDRIVER AUTOMATIC LOADING APPARATUS

[76] Inventor: James Macris, 67 Horne St., Dover, N.H. 03820

[21] Appl. No.: 769,872

[22] Filed: Oct. 1, 1991

[51] Int. Cl.$^5$ ............................................. B25B 23/06
[52] U.S. Cl. ...................................... 81/435; 81/433; 227/48
[58] Field of Search ...................... 81/57.37, 431, 433, 81/434, 435; 206/338; 227/117, 118, 120, 148, 41, 48, 49

[56] References Cited

U.S. PATENT DOCUMENTS

| | | | |
|---|---|---|---|
| 2,689,589 | 9/1954 | Allen et al. | 81/57.37 |
| 3,438,411 | 4/1969 | Rech | 81/433 X |
| 4,278,194 | 7/1981 | Ergoy | 227/48 X |
| 4,428,261 | 1/1984 | Takatsu et al. | 81/434 |
| 4,495,841 | 1/1985 | Mori et al. | 81/57.37 X |
| 4,602,537 | 7/1986 | Dixon | 81/435 X |

Primary Examiner—D. S. Meislin
Attorney, Agent, or Firm—Robert S. Smith

[57] ABSTRACT

An apparatus for feeding a plurality of associated screws to an associated power screwdriver having a chuck. The apparatus includes a main body that includes a shaft dimensioned and configured to engage the chuck of the associated power screwdriver. The main body also includes a bit and apparatus for holding the bit and transmitting rotational energy from the shaft to the bit. The apparatus also includes a magazine dimensioned and configured to receive a plurality of associated screws disposed with the respective axes thereof in substantially coplanar relationship. The apparatus also includes apparatus for detachably connecting the magazine to the main body and a pickup assembly including a spring apparatus for gripping associated screws on opposed sides of the associated screws and apparatus for pivoting the spring apparatus between a first position proximate to the magazine and a second position proximate to the bit. In some forms of the invention the apparatus for pivoting includes at least one generally arcuate member. The generally arcuate member may be dimensioned and configured to cause pivotal motion of the pickup assembly responsive to a force urging one of the associated screws into an associated workpiece. In some embodiments the magazine includes an elongated channel and a first and in some cases a second channel member having a plurality of teeth. In some cases the teeth on the channel members extend into the elongated channel.

16 Claims, 3 Drawing Sheets

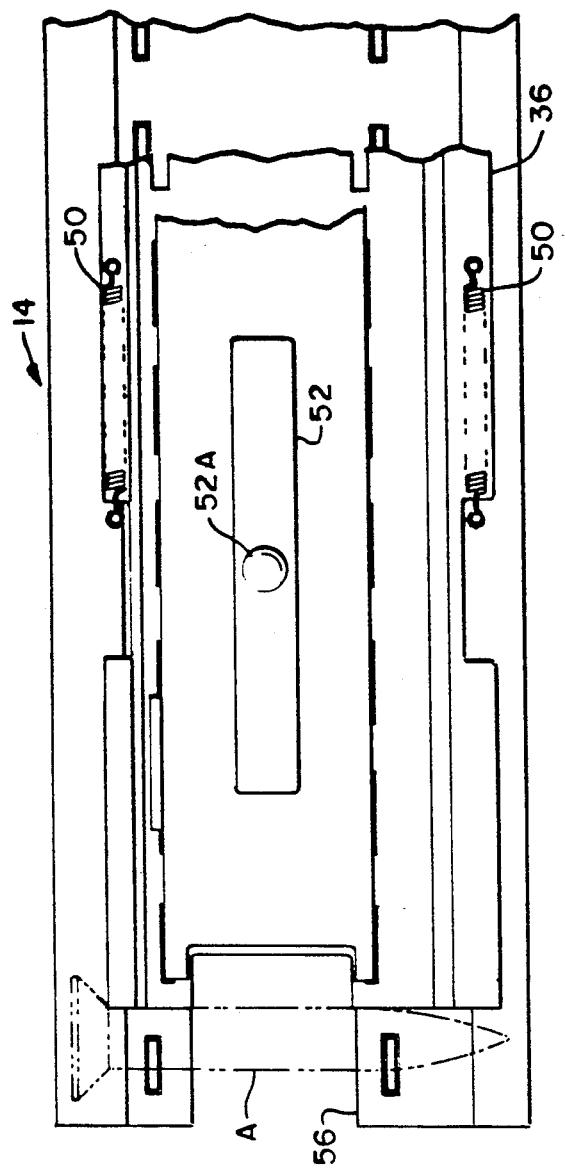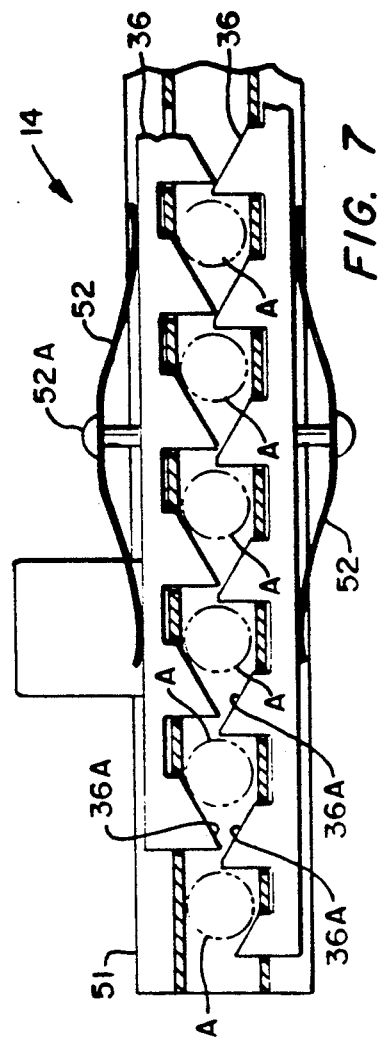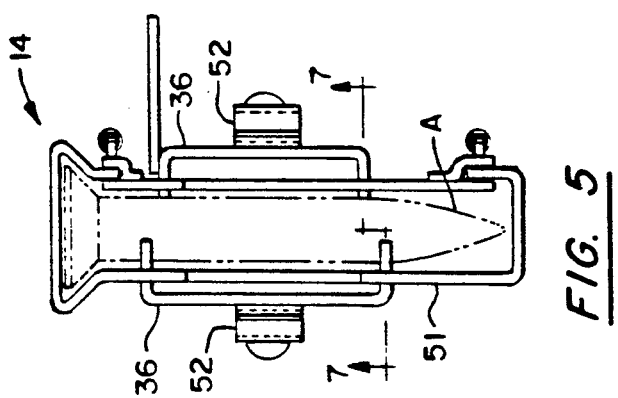

POWER SCREWDRIVER AUTOMATIC LOADING APPARATUS

BACKGROUND OF THE INVENTION

The invention relates to power screwdrivers and particularly to apparatus to automatically feed screws to such devices. A wide variety of power screwdrivers have been marketed. They typically are powered by a rechargeable battery.

Power screwdrivers are capable of tremendously increasing the productivity of a worker. The use of automatic feeds for such power screwdrivers will have an even greater impact on productivity. The applications for such devices include the construction industry including the construction of residential and commercial buildings. The invention also has application manufacturing operations. For example, even the assembly of computer housings may be accomplished more rapidly with the apparatus in accordance with the invention.

The prior art includes complex and cumbersome apparatus that has a large magazine and is pneumatically powered. Some devices include a clutch that stops rotation of the driving bit when the head of the screw is seated against a planar surface.

It is an object of the invention to provide apparatus that will be reliable.

It is an object of the invention to provide apparatus which is inexpensive to manufacture as well as requires a minimum of labor to install.

Still another object of the invention is to provide apparatus that will cooperate with a substantial range of screw sizes. It is yet another object of the present invention to provide apparatus that will not require hydraulic, pneumatic or electric power to operate the feed mechanism.

Another object of the invention is to provide apparatus that will guide an associated screw into a workpiece.

It is also an object of the invention to provide apparatus that will function with practically any brand of power screwdriver.

SUMMARY OF THE INVENTION

It has now been found that these and other objects of the invention may be attained in an apparatus for feeding a plurality of associated screws to an associated power screwdriver having a chuck which includes a main body that includes a shaft dimensioned and configured to engage the chuck of the associated power screwdriver. The main body also includes a bit and means for holding the bit and transmitting rotational energy from the shaft to the bit. The apparatus also includes a magazine dimensioned and configured to receive a plurality of associated screws disposed with the respective axes thereof in substantially coplanar relationship. The apparatus also includes means for detachably connecting the magazine to the main body and a pickup assembly including spring means for gripping associated screws on opposed sides of the associated screws and means for pivoting the spring means between a first position proximate to the magazine and a second position proximate to the bit.

In some forms of the invention the means for pivoting includes at least one generally arcuate member. The generally arcuate member may be dimensioned and configured to cause pivotal motion of the pickup assembly responsive to a force urging one of the associated screws into an associated workpiece. In some embodiments the magazine includes an elongated channel and a first and in some cases a second channel member having a plurality of teeth. In some cases the teeth on the channel members extend into the elongated channel.

In various embodiments the teeth on the first channel member and the teeth on the second channel member are disposed in opposed relationship and define notches therebetween which are dimensioned and configured to receive associated screws. The first and second channel members may include triggers dimensioned and configured to engage the pickup assembly in the first position thereof. In some cases the movement of the pickup assembly and the engagement with the triggers causes travel of the first and second channel members and movement over the associated screws disposed in the magazine.

The apparatus may include means to bias the first and second channel members and specifically the opposed teeth together. The means to bias the first and second channel members may include at least a first spring such as a leaf spring. The apparatus may also include means to bias the magazine in a direction opposite to the direction of movement of the magazine responsive to cooperation between the pickup assembly and the triggers and this may be a tension spring. The apparatus may also include means to bias the pickup assembly to rotate in a direction opposite to the direction of rotation of the pickup assembly by the generally arcuate member.

BRIEF DESCRIPTION OF THE DRAWING

The invention will be better understood by reference to the accompanying drawing in which:

FIG. 5 is a left elevational view of the magazine portion of the apparatus shown in FIG. 1.

FIG. 6 is a side elevational view of the magazine shown in FIG. 5.

FIG. 7 is a sectional view taken along the line 7—7 in FIG. 5.

DESCRIPTION OF THE PREFERRED EMBODIMENT

Referring now to FIGS. 1-7 there is shown a preferred form of the automatic loading apparatus 10 for an associated power screwdriver 11 in accordance with a preferred form of the invention. The apparatus 10 includes a main body 12 and a magazine 14. The main body 12 is shown in greatest detail in FIGS. 1-4 and the magazine 14 is shown in greatest detail in FIGS. 5-7. It will be understood that the main body 12 will ordinarily be attached to the power screwdriver 11 by straps 11A. The straps 11A will vary in construction for the particular brand of screwdriver with which the apparatus 10 is being used.

Figure 1:
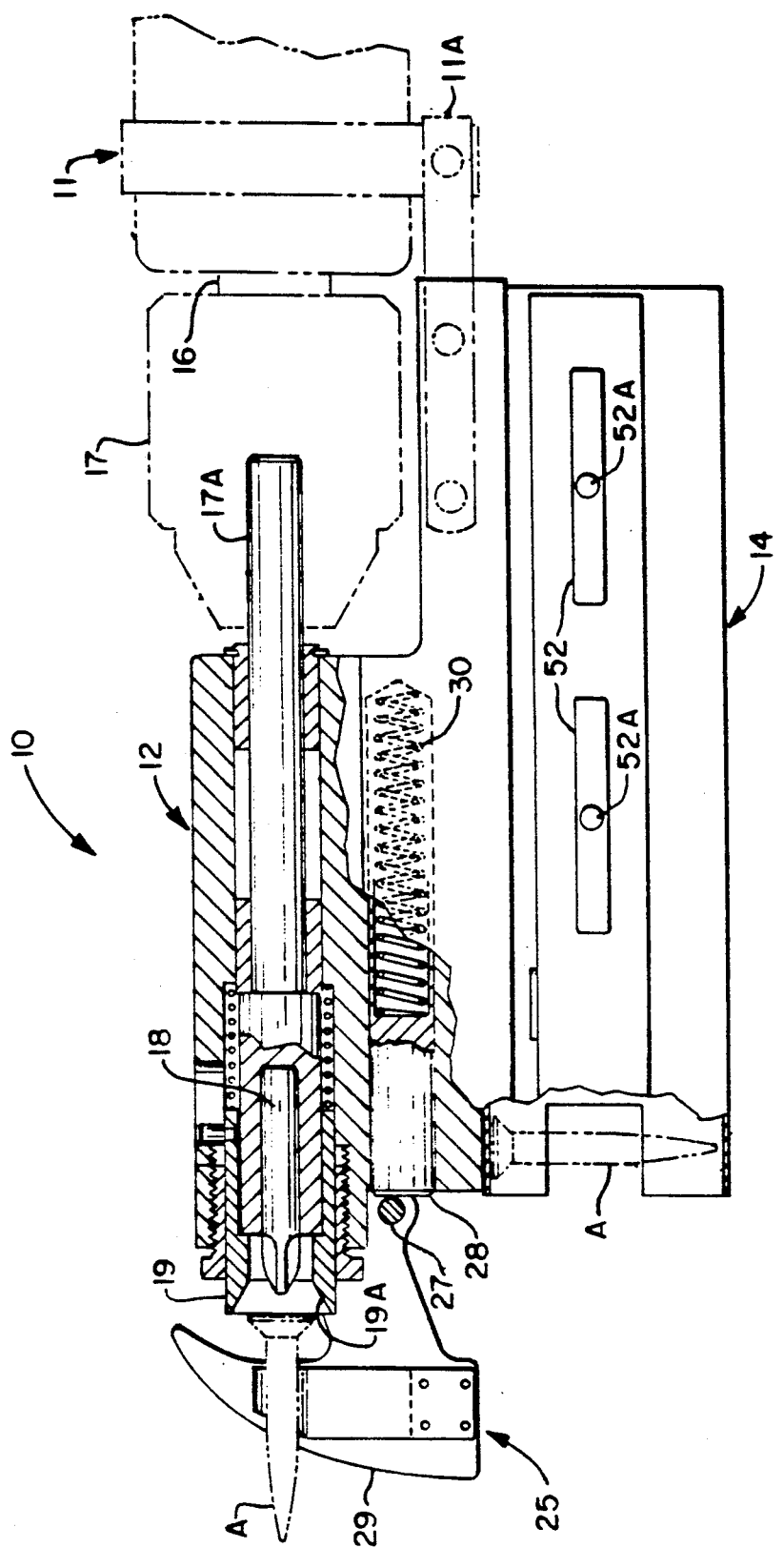
FIG. 1 is a side elevational view of a automatic screw loading apparatus for use with an associated power screwdriver that is in accordance with one form of the invention.

The associated power screwdriver 11 includes a spindle 16 that carries a chuck 17. The chuck 17 engages a shaft 17A that holds a screwdriver bit 18. The screwdriver bit 18 is surrounded by a spring-loaded sleeve 19 that has a conical opening 19A to help center a screw A as the tool 10 with the power screwdriver 11 attached thereto is pushed forward toward an associated workpiece or wall B. A transverse pin 27 shown in section in FIG. 1 holds two pickup fingers or leaf springs 26, 26 which engage respective sides of one of the associated screws A. The fingers 26,26 are fixed by rivets to respective arcuate or curved arms 29, as best seen in FIG. 1, disposed at the respective axial extremities of the pin 27. The arms 29,29 pivot about a pin 29A carried by the main body 12.

In operation, as the tool 10 is pushed forward, the curved arms 29, 29 contact the wall B and the reaction of the curved arms 29, 29 with the planar wall B causes the arms 29, 29 with the fingers 26, 26 attached thereto to rotate causing the transverse pin 27 to bear against an end of a plug 28 and compress a coil spring 30.

Figure 2:
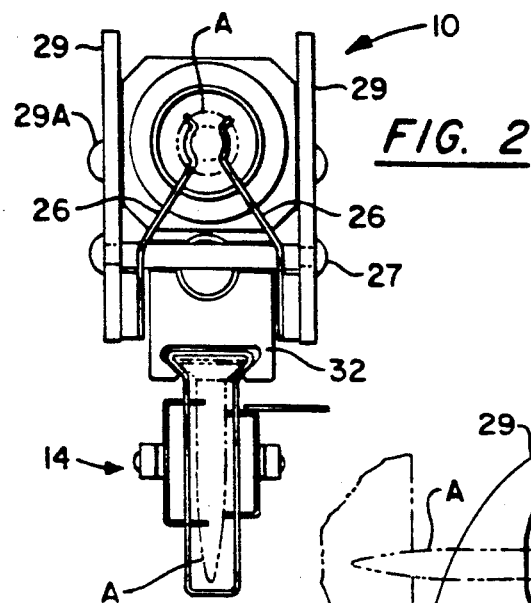
FIG. 2 is a left elevational view of the apparatus shown in FIG. 1.

As best seen in FIG. 2 the pair of leaf springs 26, 26 hold the screw A that is about to be installed. Also visible in FIG. 2 is the transverse pin 27 and the magazine 14 that engages the main body 12 by means of a dovetail groove 32.

Figure 3:
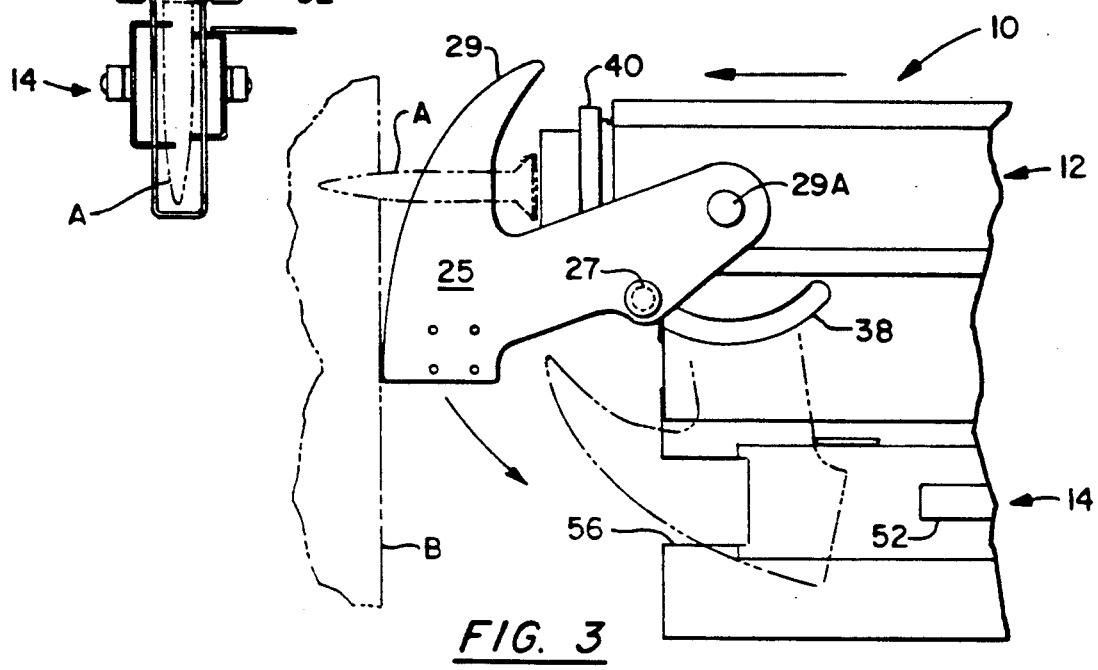
FIG. 3 is a fragmentary side elevational view to a larger scale of a portion the apparatus shown in FIG. 1 and which illustrates the positions of the elements after a screw has first being driven a short distance into a workpiece.

After the screw A has been driven a short way into the associated wall B, as best seen in FIG. 3, the pickup fingers 26, 26 will make contact with the wall B in the manner shown in FIG. 3. Further advancement or feed of the tool 10 causes the pickup finger assembly 25 including the pickup fingers 26, 26 to rotate downward or counter clock wise. When the tool 10 has moved enough to make the pickup finger assembly 25 to advance to the position shown in phantom in FIG. 3. More particularly, in the position shown in phantom the pickup finger assembly 25 has just made contact with a trigger 34. Further movement of the arms 29, 29 with the attached fingers 26, 26 will cause a ratchet member 36 to move to the right (as shown) since the trigger 34 is part of the ratchet member 36. The arcuate slots 38 in the main body 12 allow travel of the transverse pin 27 as shown most clearly in FIGS. 3 and 4.

Figure 4:
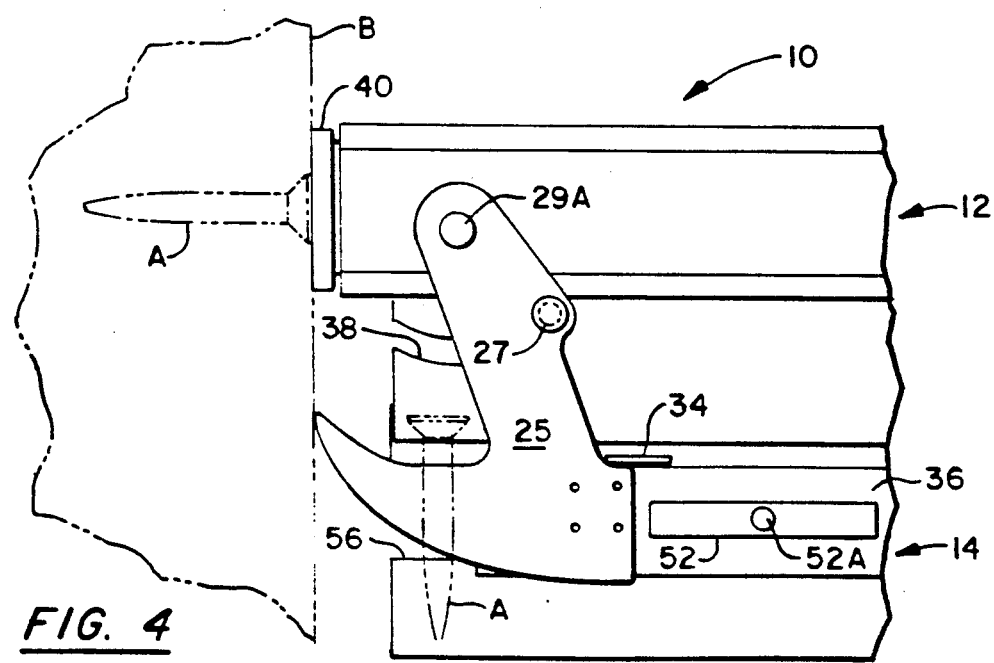
FIG. 4 is a view similar to FIG. 3 illustrating the arrangement of the elements when a screw is fully driven into a workpiece.

As best seen in FIG. 4 the screw A has been driven fully into the wall B, and can be driven no further because a stop 40 has come up against the wall surface B. In this position the two leaf springs 26, 26 in the pickup assembly are shown gripping the end or leftmost screw A disposed in the magazine 14 and the ratchet member 36 has been pushed as far to the right as is physically possible. As the tool 10 is withdrawn or removed from the wall B, the coil spring 30 pushes the plug 28 against the transverse pin 27 and returns the pickup assembly back to the left most position or original position, taking a screw A from the magazine 14 with it. A pair of coil springs 50, 50 on the ratchet member 36 pull it back to its original position, and in doing so, move all the remaining screws A in the magazine 14 up one "notch", with the screw A first in line in a position to be picked up by the pickup assembly during the next cycle.

FIGS. 5, 6, and 7 illustrate the magazine 14 in greater detail. FIG. 7 is a sectional view taken along the lines 7—7 of FIG. 5. The magazine 12 includes a form fitting shell 51 in which the screws A are encased. As seen in FIG. 5, one wall of the shell (the right-hand wall) is fitted with grooved tracks that allow it to be moved (in a left to right direction as viewed in FIG. 6). Both walls of the magazine carry a ratchet member 36. Each ratchet member 36 is a channel shaped piece with intermittently spaced ratchet teeth 36A projecting inwardly through mating slots in the wall of the shell 51.

These teeth 36A show up clearly in FIG. 7. By means of leaf springs 52 carried on pins 52A the opposed ratchet members 36 are urged inwardly into what might be called a normal position, the position shown in FIG. 7. In operation, as the pickup assembly 25 rotates down and pushes the ratchet member 36 to the right. The leaf springs 52 allow the ratchet members 36, 36 to rise and pass over the screws A in the magazine 12. Then, as the pickup assembly 25 rotates back, the tension coil springs 50, 50 pull back the ratchet members 36, 36 to their original position, taking all the remaining screws A in the magazine with them. During this action, the leaf springs 52 on the ratchet member 36 on the opposite side allows the screws to pass by into the next "notch". Each of the walls of the shell 51 of the magazine 14 has a cutout 56 in the end of the magazine 14 where the next screw is disposed in the "pickup" position. This is necessary to allow entry of the springs 26, 26 of the pickup assembly 25.

It will be understood that the apparatus in accordance with the invention will ordinarily have a plurality of magazines 14 of various sizes to accommodate a range of screw sizes. For many manufacturing and construction operations the worker will have a plurality of preloaded magazines that can be quickly installed on the main body as a magazine 14 is emptied. In this manner the flow of work is not interrupted.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. Apparatus for feeding a plurality of associated screws to an associated elongated power screwdriver having a chuck and a first geometric axis which comprises:

a main body that includes a shaft dimensioned and configured to engage the chuck of the associated power screwdriver, a bit and means for holding said bit and transmitting rotational energy from said shaft to said bit;

a magazine dimensioned and configured to receive a plurality of associated screws disposed with the respective axes thereof in substantially coplanar relationship, said magazine having a second geometric ais, aid magazine havin a discharge portion;

means for detachably connecting said magazine to said main body; and a pickup assembly carried on said main body that includes a spring means for gripping associated screws on opposed sides of each of the associated screws and means for pivoting said spring means about a pivot axis between a first position proximate said discharge portion of said magazine and a second position proximate to said bit, said means for pivoting being pivotally carried on said main body for pivotal movement about said pivot axis, said means for pivoting being pivoted responsive to an axial force on the associated power screwdriver, said means for pivoting including at least one generally arcuate member, said generally arcuate member being mounted on said main body and with a pivot axis spaced from said second geometric axis; said magazine including an elongated channel and a first channel member having a plurality of teeth.

2. The apparatus as described in claim 1 wherein:
said teeth on said first channel member extend into said elongated channel.

3. The apparatus as described in claim 2 wherein:
said magazine includes a second channel member having a plurality of teeth.

4. The apparatus as described in claim 3 wherein:
said teeth on said second channel member extend into said elongated channel.

5. The apparatus as described in claim 4 wherein:
said teeth on said first channel member and said teeth on said second channel member are disposed in opposed relationship and define notches therebetween which are dimensioned and configured to receive associated screws.

6. The apparatus as described in claim 5 wherein:
said first and second channel members include triggers dimensioned and configured to engage said pickup assembly in said first position thereof.

7. The apparatus as described in claim 6 wherein:
the movement of said pickup assembly and the engagement with said triggers causes travel of said first and second channel members and movement over the associated screws disposed in said magazine.

8. The apparatus as described in claim 7 further including:
means to bias said first and second channel members and specifically the opposed teeth together.

9. The apparatus as described in claim 8 wherein:
said means to bias said first and second channel members includes at least a first spring.

10. The apparatus as described in claim 9 wherein:
said first spring is a leaf spring.

11. The apparatus as described in claim 10 wherein:
said apparatus includes a means to bias said magazine in a direction opposite to the direction of movement of said magazine responsive to cooperation between said pickup assembly and said triggers.

12. The apparatus as described in claim 11 wherein:
said means to bias said magazine includes at least one tension spring.

13. The apparatus as described in claim 12 wherein:
said apparatus includes means for biasing said pickup assembly to rotate in a direction opposite to the direction of rotation of said pickup assembly by said generally arcuate member.

14. The apparatus as described in claim 13 wherein:
said means for biasing said pickup assembly includes a transverse pin cooperating with said tension spring.

15. The apparatus as described in claim 14 wherein:
said means for biasing said pickup assembly includes a second spring cooperating with said transverse pin.

16. The apparatus as described in claim 15 wherein:
said housing includes an arcuate slot for receiving said transverse pin.

* * * * *